MANIFOLD IMAGING METHOD

Filed July 1, 1969

INVENTOR.
IVAR T. KROHN
GEOFFREY A. PAGE
BY
Raymond C Loyer
ATTORNEY

United States Patent Office 3,692,516
Patented Sept. 19, 1972

3,692,516

MANIFOLD IMAGING METHOD

Ivar T. Krohn and Geoffrey A. Page, Rochester, N.Y., assignors to Xerox Corporation, Rochester, N.Y.

Filed July 1, 1969, Ser. No. 838,280
Int. Cl. G03g *13/00*
U.S. Cl. 96—1 R 11 Claims

ABSTRACT OF THE DISCLOSURE

An improved imaging process wherein a cohesively weak electrically photosensitive imaging layer is sandwiched between a donor layer and a receiver layer. While subjected to an electric field the imaging layer is exposed to an imagewise pattern of electromagnetic radiation from the receiver side and to uniformly distributed electromagnetic radiation from the donor side. Upon separation of the sandwich, the imaging layer fractures in imagewise configuration with a positive image adhering to one of the donor or receiver layers and a negative image adhering to the other layers.

BACKGROUND OF THE INVENTION

The present invention relates to manifold layer transfer imaging and more specifically to a process which provides improved imaging characteristics of the electrically photosensitive materials employed therein.

Although color imaging techniques based on the transfer of an imaging layer have been known in the past, these techniques have always been difficult to operate because they depend on photochemical reactions and generally involve the use of distinct layer materials for the two functions of imagewise transfer and image coloration. A typical example of the complex structures and sensitive materials employed in prior art techniques is described in U.S. Pat. 3,091,529 to Buskes. A more comprehensive discussion of prior art imaging techniques based on layer transfer may be found in copending application Ser. No. 452,641, filed May 3, 1965, in the U.S. Patent Office, now abandoned.

Copending application Ser. No. 452,641, filed May 3, 1965, describes an imaging system utilizing a manifold sandwich comprising an electrically photosensitive material between a pair of sheets. In this imaging system, an imaging layer is prepared by coating a layer of cohesively weak electrically photosensitive imaging material onto a substrate. In one form the imaging layer comprises an electrically photosensitive material such as metal-free phthalocyanine dispersed in a cohesively weak insulating binder. This coated substrate is called the donor. When needed, in preparation for the imaging operation, the imaging layer is activated as by contacting it with a swelling agent, solvent, or partial solvent for the material, or by heating. This step may be eliminated, of course, if the layer retains sufficient residual solvent after having been coated on the substrate from a solution or paste or if sufficiently cohesively weak to fracture in response to the application of electromagnetic radiation and electrical field. After activation a receiving sheet is laid over the surface of the imaging layer. An electric field is then applied across the imaging layer while it is exposed to a pattern of light and shadow representative of the image to be reproduced. Upon separation of the donor substrate or sheet and receiving sheet, the imaging layer fractures along the lines defined by the pattern of light shadow to which the imaging layer has been exposed. Part of the imaging layers is transferred to one of the sheets while the remainder is retained on the other sheet so that a positive image, that is, a duplicate of the original is produced on one sheet while a negative image is produced on the other.

Copending application Ser. No. 609,058, filed Jan. 13, 1967, now abandoned, describes a modified manifold imaging process wherein the electric field across the imaging layer is modified by reducing, grounding or reversing the field after image exposure of the imaging layer. By such means the image sense normally obtained in the manifold imaging process is reversed. That is, the respective sheets upon which the positive and negative image are obtained are reversed when the electric field employed during the imaging step is modified subsequent to the imaging step but prior to sandwich separation.

In the manifold imaging process the imaging layer containing the electrically photosensitive materials can be exposed in several different modes. That is, conventionally a transparent donor sheet is employed and the imaging layer is exposed through the donor sheet. In some instances it is preferred that the imaging layer be exposed from the receiver side of the manifold sandwich through a transparent receiver. Also the imaging layer can be exposed prior to being incorporated into a manifold sandwich by electrically charging a donor sheet and imaging layer, then exposing it to an imagewise pattern of light and shadow either through a transparent donor sheet or directly on the uncovered surface of the imaging layer.

Although usable images are obtained by the various imaging modes and image sense reversal procedures, a great variety of image quality is observed between different electrically photosensitive materials. That is, some materials provide reduced image quality when subjected to field reversal after imaging while other materials may provide inferior image quality or require a large amount of light when exposed from the receiver side of the manifold sandwich. A process has been discovered which improves the quality of images obtained from such imaging materials when exposed from the receiver side of the manifold sandwich or subjected to field reversal after imagewise exposure.

SUMMARY OF THE INVENTION

An object of this invention is to provide a layer transfer imaging process wherein images of improved quality are obtained.

Another object of this invention is to provide a manifold layer transfer imaging process wherein high quality images are obtained when the imaging layer is exposed through the receiver side of the manifold sandwich.

Another object of this invention is to provide a manifold imaging process wherein images of improved quality are obtained with image sense reversal techniques.

Another object of this invention is to provide a process for improving the imaging characteristics of electrically photosensitive material employed in the manifold imaging process.

In accordance with this invention, a cohesively weak electrically photosensitive imaging layer is sandwiched between a donor layer and a receiver layer which layers are at least partially transparent to electromagnetic radiation to which the imaging layer is sensitive. An electrical potential is placed across the imaging layer, and it is exposed to an imagewise pattern of activating electromagnetic radiation through the receiver layer. While subjected to the electrical potential and either before, during or after imagewise exposure, the imaging layer is exposed to evenly distributed or general illumination through the donor layer. After both exposures the receiver and donor layers are separated whereby the imaging layer fractures in imagewise configuration with a positive image adhering to one of the donor and receiver layers and a negative image adhering to the other of said donor and receiver layers. Normally, the process of this invention provides a positive copy on the receiver layer and a negative or reversal of the original image on the donor layer. The image sense produced can be modified by subjecting the manifold sandwich to such techniques as field modification as described in copending application Ser. No. 609,058 referred to above prior to separation of the sandwich which application is incorporated herein by reference.

Previously, some of the electrically photosensitive materials useful in the manifold imaging process provided high-quality images in the various imaging modes and image reversal techniques whereas other electrically photosensitive materials provided images of varying quality dependent upon the imaging mode employed in the manifold imaging process. In accordance with the process of this invention, the electrically photosensitive materials useful in the manifold imaging process are rendered versatile in that high-quality images are produced even when imagewise exposure of the imaging layer is accomplished from the receiver side of the manifold sandwich and when image sense reversal techniques are employed.

A visible light source, an ultraviolet light source or any other suitable source of electromagnetic radiation may be employed to expose the imaging layer of this invention. The electrically photosensitive material is chosen so as to be responsive to the wavelength of the electromagnetic radiation employed. It is to be noted that different electrically photosensitive materials have different spectral response and that the spectral response of many electrically photosensitive materials may be modified by dye sensitization so as to either increase or narrow the spectral response of the material to a peak or to broaden it to make it more panchromatic in its response.

Accordingly, the amount of electromagnetic radiation required for imagewise exposure and for general illumination in accordance with the process of this invention varies greatly dependent upon the electrically photosensitive imaging material employed in the imaging layer. Generally, imagewise exposure through the receiver is in the range of from about .1 to about 2 foot-candle seconds while the general illumination through the donor layer is in the range of from about .5 to about 60 foot-candle seconds. Of course, the light transmittance of the donor and receiver layers must be taken into account in determining the amount of electromagnetic radiation to be employed through each layer. This can be easily determined experimentally, since if a too small amount of general illumination through the donor is employed, no imagewise fracture of the imaging layer will occur, whereas if too small an amount of imagewise electromagnetic radiation through the receiver is employed, the entire imaging layer will adhere to the receiver layer upon separation of the sandwich.

The electric field is provided by means known to the art to subject an area to an electric field. Thus, the electrically photosensitive material can be incorporated into a manifold sandwich and subjected to an electric field by placing the sandwich between a pair of electrodes. The polarity of the electric field between the electrodes is held constant during the exposure step of the process. The electric field can also be provided by employing an electrically insulating material in the donor and receiver layers forming the manifold sandwich and producing a static charge in the insulating layers. By employing the insulating sheets, which retain an electric charge, the manifold sandwich can be passed between and in contact with charge bearing members such as electrically charged rollers whereby an electric charge is transferred to the static sheet. Thus, the static charge is developed by providing an electrical charge bearing member in electrical communication with the electrically insulating layer. The static charges retained in insulating donor and receiver sheets are sufficient to provide an electric field across the sandwich during subsequent image exposure and sandwich separation steps in the manifold imaging process.

The electric field employed in the process of this invention is desirably in the range of from 2,000 to 10,000 volts per mil. across the imaging layer. Preferably the electric field is in the range of from about 3,000 to 7,000 volts per mil. To attain such electric field with static charges in insulating layers, a potential of from about 5,000 to about 20,000 volts in the charge bearing member is usually employed. Higher voltages can be employed but are not desirable. The electrodes employed may comprise any suitable conductive material and may be flexible or rigid. Typical conductive materials include metals such as aluminum, brass, steel, copper, nickel, zinc etc., metallic coatings on plastic substrates, rubber rendered conductive by the inclusion of a suitable material therein or paper rendered conductive by the inclusion of a suitable material therein or through conditioning in a humid atmosphere to insure the presence therein of sufficient water content to render the material conductive. Such electrodes are, for example, conductive rollers or corona discharge devices as described in U.S. Pat. 2,588,699 to Carlson and U.S. Pat. 2,777,957 to Walkup, U.S. Pat. 2,885,556 to Gundlach or by using conductive rollers as described in U.S. Pat. 2,980,834 to Tregay et al. Other means of transmitting a static charge will occur to those skilled in the art.

In the manifold imaging process wherein the imaging layer is exposed to activating electromagnetic radiation while positioned between the electrodes which establish the electrical field across the sandwich, the electrodes must be at least partially transparent. The transparent conductive electrode may be made with any suitable conductive transparent material and may be flexible or rigid. Typical conductive transparent materials include: cellophane, conductively coated glass, such as tin or indium oxide coated glass, aluminum coated glass, or similar coatings on plastic substrates. NESA, a tin oxide coated glass, available from Pittsburgh Plate Glass Company is preferred because it is a good conductor, highly transparent and is readily available. In the process of this invention wherein the donor and/or receiver is composed of conductive material, each may also be used as the electrode by which the imaging layer is subjected to an electric field. That is, either one or both of the donor sheet and receiver sheets may serve a dual function in the process of this invention.

The imaging layer can comprise a wide variety of electrically photosensitive material. Typical organic electritrically photosensitive materials include: quinacridones such as 2,9-dimethyl quinacridone, 4,11-dimethyl quinacridone, 2,10 - dichloro - 6,13 - dihydro-quinacridone, 2,9 - dimethoxy - 6,13 - dihydro quinacridone, 2,4,9,11-tetrachloro-quinacridone, and solid solutions of quinacridones and other compositions as described in U.S. Pat. 3,160,510; carboxamides such as:

N-2″-pyridyl-8,13-dioxodinaphtho-(2,1–2′,3′)-furan-6-carboxamide,
N-2″-(1″,3″,5″-triazyl-8,13-dioxodinaphtho-(2,1–2′,3′)-furan-6-carboxamide,
anthra-(2,1)-naphtho-(2,3-d)-furan-9,14-dione-7-(2′-methylphenyl) carboxamide;

carboxanilides such as:

8,13-dioxodinaphtho-(2,1–2′,3′)-furan-6-carbox-p-methoxy-anilide,
8,13-dioxodinaphtho-(2,1–2′,3′)-furan-6-carbox-p-methylanilide,
8,13-dioxodinaphtho-(2,1–2′,3′)-furan-6-carbox-p-cyanoanilide;

triazines such as:

2,4-diaminotriazine,
2,4-di (1′-anthraquinonyl-amino)-6-(1″-pyrenyl)-triazine, 2,4-di(1'-anthraquinonyl-amino)-6-(1"-naphthyl)-triazine,
2,4-di (1'-naphthyl-amino)-6-(1'-perylenyl)-triazine,
2,4,6-tri (1',1",1'''-pyrenyl) triazine;

benzopyrrocolines such as:

2,3-phthaloyl-7,8-benzo-pyrrocoline,
1-cyano-2,3-phthaloyl-7,8-benzopyrrocoline,
1-cyano-2,3-phthalocy-5-nitro-7,8-benzopyrrocoline,
1-cyano-2,3-phthaloyl-5-acetamido-7,8-benzopyrrocoline;

anthraquinones such as:

1,5-bis-(beta-phenylethylamino) anthraquinone,
1,5-bis-(3'-methoxypropylamino) anthraquinone,
1,5-bis (benzylamino) anthraquinone,
1,5-bis (phenylbutylamino) anthraquinone, 1,2,5,6-di (c,c'-diphenyl)-triazole-anthraquinone,
4-(2'-hydroxyphenylmethoxyamino) anthraquinone;

azo compounds such as:

2,4,6-tris (N-ethyl-N-hydroxy-ethyl-p-aminophenylazo) phloroglucinol,
1,3,5,7-tetra-hydroxy-2,4,6,8-tetra (N-methyl-N-hydroxy-ethyl-p-amino-phenylazo) naphthalene,
1,3,5-trihydroxy-2,4,6-tri (3'-nitro-N-methyl-N-hydroxy-methyl-4'-aminophenylazo) benzene,
3-methyl-1-phenyl-4- (3'-pyrenylazo)-2-pyrazolin-5-one,
1-(3'-pyrenylazo)-2-hydroxy-3-naphthanilide,
1-(3'-pyrenylazo)-2-naphthol,
1-(3'-pyrenylazo)-2-hydroxypyrene,
1-(3'-pyrenylazo)-2-hydroxy-3-methyl-xanthene,
2,4,6-tris (3'-pyrenylazo) phloroglucinol,
2,4,6-tris (1'-phenanthrenylazo) phloroglucinol,
1-(2-'methoxy-5'-nitro-phenylazo)-2-hydroxy-3' nitro-3-naphthanilide;

salts and lakes of compounds derived from 9-phenyl-xanthene, such as:

phosphotungstomolybdic lake of 3,6-bis (ethylamino)-9,2'-carboxyphenyl xanthenonium chloride,
barium salt of 3-2'-toluidineamino-6-2"-methyl-4"-sulphophenyl-amino-9,2" '-carboxyphenylxanthene,
phosphomolybdic lake of 3,6-bis (ethylamino)-2,7-dimethyl-9,2'-carbethoxyphenylxanthenonium chloride;

dioxazines such as:

2,9-dibenzoyl-6,13-dichloro-triphenodioxazine,
2,9-diacetyl-6,13-dichloro-triphenodioxazine,
3,10-dibenzoylamino-2,9-diisopropoxy-6,13-dichloro-triphenodioxazine,
2,9-difuroyl-6,13-dichlorotriphenodioxazine;

lakes of fluorescein dyes such as:

lead lake of 2,7-dinitro-4,5-dibromo fluorescein,
lead lake of 2,4,5,7-tetrabromo fluorescein,
aluminum lake of 2,4,5,7-tetrabromo-10,11,12,13-tetra-chloro fluorescein;

bisazo compositions such as:

N,N'-di [1-(1'-naphthylazo)-2-hydroxy-8-naphthyl] adipdiamide,
N,N'-di-1-(1'-naphthylazo)-2-hydroxy-8-naphthyl succindiamide,
bis-4,4'-(2"-hydroxy-8"N,N'-diterephthala-mide-1-naphthylazo) biphenyl,
3,3'-methoxy-4,4'-diphenyl-bis (1"-azo-2"-hydroxy-3"-naphthanilide);

pyrenes such as:

1,3,6,8-tetra-cyanopyrene,
1,3-dicyano-6,8-dibromo-pyrene,
1,3,6,8-tetraaminopyrene,
1-cyano-6-nitropyrene;

phthalocyanines such as:

beta-form metal free phthalocyanine, copper phthalocyanine, tetrachloro phthalocyanine, the "*x*" form of metal-free phthalocyanine as described in U.S. Pat. 3,357,989; metal salts and lakes of azo dyes, such as:

calcium lake of 6-bromo-1(1'-sulfo-2-naphthylazo)-2-naphthol,
barium salt of 6-cyano-1(1'-sulfo-2-naphthylazo)-2-naphthol,
calcium lake of 1-(2'-azonaphthalene-1'-sulfonic acid)-2-naphthol,
calcium lake of 1-(4'-ethyl-5'-chloroazobenzene-2'-sulfonic acid)-2-hydroxy-3-naphthoic acid;

and mixtures thereof.

Typical inorganic electrically photosensitive materials include cadmium sulfide, cadmium sulfoselenide, zinc oxide, zinc sulfide, sulphur selenium, mercuric sulfide, lead oxide, lead sulfide, cadmium selenide, titanium dioxide, indium trioxide and the like.

In addition to the aforementioned organic materials, other organic materials which may be employed in the imaging layer include polyvinylcarbazole; 2,4-bis (4,4'-diethyl-aminophenyl) - 1,3,4 - oxidiazole; N-isopropylcarbazole and the like. Other electrically photosensitive materials useful in the process of this invention are listed in copending application Ser. No. 708,380, filed Feb. 26, 1968 which is incorporated herein by reference.

It is also to be understood that the electrically photosensitive particles themselves may consist of any suitable one or more of the aforementioned electrically photosensitive materials, either organic or inorganic, dispersed in, in solid solution in, or copolymerized with, any suitable insulating resin whether or not the resin itself is photosensitive. This particular type of particle may be particularly desirable to facilitate dispersion of the particle, to prevent undesirable reactions between the binder and the photosensitive material or between the photosensitive and the activator and for similar purposes. Typical resins of this type include polyethylene, polypropylene, polyamides, polymethacrylates, polyacrylates, polyvinyl chlorides, polyvinyl acetates, polystyrene, polysiloxanes, chlorinated rubbers, polyacrylonitrile, epoxies, phenolics, hydrocarbon resins and other natural resins such as resin derivatives as well as mixtures and copolymers thereof.

The "*x*" form phthalocyanine is preferred because of its excellent photosensitivity although any suitable phthalocyanine may be used to prepare the imaging layer of this invention. The phthalocyanine used may be in any suitable crystal form. It may be substituted or unsubstituted both in the ring and straight chain portions. Reference is made to a book entitled "Phthalocyanine Compounds" by F. H. Moser and A. L. Thomas, published by the Reinhold Publishing Company, 1963 edition for a detailed description of phthalocyanines and their synthesis. As above noted, any suitable phthalocyanine may be used to prepare the photoconductive layer of the present invention. Typical phthalocyanines are listed in copending application Ser. No. 708,380 referred to above.

The basic physical property desired in the imaging layer of the manifold imaging process is that it is frangible as prepared or after having been suitably activated. That is, the layer must be sufficiently weak structurally so that the application of electrical field combined with the action of actinic radiation on the electrically photosensitive materials will fracture the imaging layer upon separation of the manifold sandwich. Further, the layer must respond to the application of field, the strength of which is below that field strength which will cause electrical breakdown or arcing across the imaging layer. Another term for "cohesively weak," therefore, would be "field fracturable."

Although the imaging layer must be cohesively weak in order to fracture in imagewise configuration in the manifold imaging process, the electrically photosensitive material to be treated in accordance with the electrification treatment of this invention need not be cohesively weak. The electrically photosensitive material to be treated may be incorporated into an imaging layer and treated in accordance with the process of this invention without rendering the layer cohesively weak. After treatment by the process of this invention, the layer may be rendered cohesively weak by the application thereto of an activator as will be more fully described below.

The imaging layer serves as the photoresponsive element of the system as well as the colorant for the final image produced. Other colorants such as dyes and pigments may be added to the imaging layer so as to intensify or modify the color of the final images produced when color is important. Preferably, the imaging layer is selected so as to have a high level of response while at the same time being intensely colored so that a high contrast image can be formed by the high gamma system of this invention. The imaging layer may be homogeneous comprising, for example, a solid solution of two or more pigments. The imaging layer may also be heterogeneous comprising, for example, pigment particles dispersed in a binder.

One technique for achieving low cohesive strength in the imaging layer is to employ relatively weak, low molecular weight materials therein. Thus, for example, in a single component homogeneous imaging layer, a monomeric compound or a low molecular weight polymer complexed with a Lewis acid to impart a high level of photoresponse to the layer may be employed. Similarly, when a homogeneous layer utilizing two or more components in solid solution is selected to make up the imaging layer, either one or both of the components of the solid solution may be a low molecular weight material so that the layer has the desired low level of cohesive strength. This approach may also be taken in connection with the heterogeneous imaging layer. Although the binder material in the heterogeneous system may in itself be photosensitive, it does not necessarily have this property. Materials may be selected for use as this binder material solely on the basis of physical properties without regard to their photosensitivity. This is also true of the two component homogeneous system where photoinsensitive materials with the desired physical properties can be used. Any other technique for achieving low cohesive strength in the imaging layer may also be employed. For example, suitable blends of incompatible materials such as a blend of a polysiloxane resin with a polyacrylic ester resin may be used either as the binder layer in a heterogeneous system or in conjunction with a "homogeneous" system in which the photoresponsive material may be either one of the incompatible components (complexed with a Lewis acid) or a separate and additional component of the layer. The thickness of the imaging layer whether homogeneous or heterogeneous ranges from about 0.2 micron to about 10 microns generally about 0.5 micron to about 5 microns and preferably about 2 microns.

The ratio of photosensitive pigment to binder by weight in the heterogeneous system may range from about 10 to 1 to about 1 to 10 respectively, but it has generally been found that properties in the range of from about 1 to 4 to about 2 to 1 respectively produce the best results and, accordingly, this constitutes a preferred range.

The binder material in the heterogeneous imaging layer or the material used in conjunction with the electrically photosensitive materials in the homogeneous layer, where applicable, may comprise any suitable cohesively weak insulating material or materials which can be rendered cohesively weak. Typical materials include: microcrystalline waxes such as: Sunoco 1290, Sunoco 5825, Sunoco 985, all available from Sun Oil Co.; Paraflint RG, available from the Moore and Munger Company; paraffin waxes such as: Sunoco 5512, Sunoco 3425, available from Sun Oil Co.; Sohio Parowax available from Standard Oil of Ohio; waxes made from hydrogenated oils such as: Capitol City 1380 wax, available from Capitol City Products, Co., Columbus, Ohio; Caster Wax L–2790, available from Baker Caster Oil Co.; Vitikote L–304, available from Duro Commodities; polyethylenes such as: Eastman Epolene N–11, Eastman Epolene C–12, available from Eastman Chemical Products Co.; Polyethylene DYJT, Polyethylene DYLT, Polyethylene DYPT, all available from Union Carbide Corp.; Marlex TR 822, Marlex 1478, available from Phillips Petroleum Co.; Epolene C–13, Epolene C–10, available from Eastman Chemical Products, Co.; Polyethylene AC8, Polyethylene AC612, Polyethylene AC324, available from Allied Chemicals; modified styrenes such as: Piccotex 75, Piccotex 100, Piccotex 120, available from Pennsylvania Industrial Chemical; vinylacetate-ethylene copolymers such as: Elvax Resin 210, Elvax Resin 310, Elvax Resin 420, available from E. I. du Pont de Nemours & Co., Inc.; Vistanex MH, Vistanex L–80, available from Enjay Chemical Co.; vinyl chloride-vinyl acetate copolymers such as: Vinylite VYLF, available from Union Carbide Corp.; styrene-vinyl toluene copolymers; polypropylenes; and mixtures thereof. The use of an insulating binder is preferred because it allows for the use of a larger range of electrically photosensitive pigments.

A mixture of microcrystalline wax and polyethylene is preferred because it is cohesively weak and an insulator.

Where the imaging layer is not sufficiently cohesively weak to allow imagewise fracture, it is desirable to include an activation step in the process of this invention. The activation step may take many forms such as heating the imaging layer thus reducing its cohesive strength or applying a substance to the surface of the imaging layer or including a substance in the imaging layer which substance lowers the cohesive strength of the layer or aids in lowering the cohesive strength. The substance so employed is termed an "activator." Preferably, the activator should have a high resistivity so as to prevent electrical breakdown of the manifold sandwich. Accordingly, it will generally be found to be desirable to purify commercial grades of activators so as to remove impurities which might impart a higher level of conductivity. This may be accomplished by running the fluids through a clay column or by employing any other suitable purification technique. Generally speaking, the activator may consist of any suitable material having the aforementioned properties. For purposes of this specification and the appended claims, the term activator shall be understood to include not only materials which are conventionally termed solvents but also those which are partial solvents, swelling agents or softening agents for the imaging layer. The activator can be applied at any point in the process prior to separation of the manifold sandwich.

It is generally preferable that the activator have a relatively low boiling point so that fixing of the resulting image can be accomplished upon evaporation of the activator. If desired, fixing of the image can be accomplished more quickly with mild heating at most. It is to be understood, however, that the invention is not limited to the use of these relatively volatile activators. In fact, very high boiling point non-volatile activators including silicone oils such as dimethylpolysiloxanes and vary high boiling point long chain aliphatic hydrocarbon oils oridinarily used as transformer oils such as Wemco-C transformer oil, available from Westinghouse Electric Co., have also been successfully utilized in the imaging process. Although these less volatile activators do not dry off by evaporation, image fixing can be accomplished contacting the final image with an adsorbent sheet such as paper which absorbs the activator fluid. In short, any suitable volatile or non-volatile activator may be employed. Typical activators include Sohio Odorless Solvent 3440, an aliphatic (kerosene) hydrocarbon fraction, available from Standard Oil Co. of Ohio, carbon tetrachloride, petroleum ether, Freon 214 (tetrafluorotetrachloropropane), other halogenated hydrocarbons such as chloroform, methylene chloride, trichloroethylene, perchloroethylene, chlorobenzene, trichloromonofluoromethane, trichlorotrifluoroethane, trichlorotrifluoroethane, ethers such as diethyl ether; diisopropyl ether, dioxane tetrahydrofuran, ethyleneglycol monoethyl ether, aromatic and aliphatic hydrocarbons such as benzene, toluene, xylene, hexane, cyclohexane, gasoline, mineral spirits and white mineral oil, vegetable oils such as coconut oil, babussu oil, palm oil, olive oil, caster oil, peanut oil and neatsfoot oil, decane, dodecane and mixtures thereof. Sohio Odorless Solvent 3440 is preferred because it is odorless, nontoxic and has a relatively high flash point.

Although the imaging layers may be prepared as self-supporting films, normally these layers are coated onto a sheet refererd to above as the donor sheet or substrate. For convenience the combination of imaging layer and donor sheet is referred to as the donor. When employing a binder, the electrically photosensitive material can be mixed in the binder material by conventional means for blending solids as by ball milling. After blending the ingredients of the imaging layer, the desired amount is coated on a substrate. In a particularly preferred form of the invention an imaging layer comprising the electrically photosensitive material dispersed in a binder is coated onto a transparent, electrically insulating donor sheet.

The imaging layer may be supplied in any color desired either by taking advantage of the natural color of the photosensitive material or binder materials in the imaging layer or by the use of additional dyes and pigments therein whether photoresponsive or not and, of course, various combinations of these photoresponsive and non-photoresponsive colorants may be used in the imaging layer so as to produce the desired color.

The donor layer and receiver layer may comprise any suitable electrically insulating or elecertically conductive material. Insulating materials are preferred since they allow the use of high strength polymeric materials. Typical insulating materials include polyethylene, polypropylene, polyethylene, terephthalate, cellulose acetate, paper, plastic coated paper, such as polyethylene coated vinyl chloride-vinylidene chloride copolymers and mixtures thereof. Mylar (a polyester formed by the condensation reaction between ethylene glycol and terephthalic acid avaliable from E. I. du Pont de Nemours & Co., Inc.) is preferred because of its durability and excellent insulative properties. Not only does the use of this type of high strength polymer provide a strong substrate for the positive and negative images formed on the donor substrate and receiver layer but, in addition, it provides an electrical barrier between the electrodes and the imaging layer which tends to inhibit electrical breakdown of the system while subjecting the manifold sandwich to an electrical field. The donor and receiver layers may each be selected from different materials. Thus a manifold sandwich can be prepared by employing an insulating donor layer while a conductive material is employed as a receiver layer.

As stated above, the donor and receiver layers are at least partially transparent to the electromagnetic radiation employed. Thus, relatively opaque materials such as paper can be employed. The amount of electromagnetic radiation is correspondingly increased with the opacity of the donor and receiver layers.

DESCRIPTION OF THE DRAWINGS

The advantags of this improved method of imaging will become apparent upon consideration of the detailed disclosure of the invention especially when taken in conjunction with the accompanying drawings wherein:

Referring now to FIG. 1, imaging layer 2 comprising photosensitive particles 4 dispersed in a binder 3 is deposited on an insulating donor substrate or sheet 5. Receiver sheet or layer 6 rests upon imaging layer 2. The donor and receiver layers are preferably insulating materials so that they will hold a charge placed on their surface.

Referring now to FIG. 2, the first step in the imaging process is the optional activation step. Although the activator may be applied by any suitable technique such as with a brush, with a smooth or rough surfaced roller, by flow coating, by vapor condensation or the like, FIG. 2 diagrammaitcally illustrates the process steps of this invention showing the activator fluid 23 being sprayed onto imaging layer 12 of the manifold sandwich from container 24. Following the deposition of this activator fluid, the sandwich is closed by a roller 26 which also serves to squeeze out any excess activator fluid which may have been deposited. The activator lowers the cohesive strength of imaging layer 12. In certain instances the first two steps of the imaging process as diagrammatically illustrated in FIG. 2 may be omitted, thus for example a manifold sandwich may be supplied wherein imaging layer 12 is initially fabricated to have a low enough cohesive strength so that activation may be omitted and receiving layer 16 may be placed on the surface of imaging layer 12 at the time when that layer is coated on substrate 17. It is generally preferable, however, to include an activation step in the process because stronger and more permanent imaging layers may then be provided which can withstand storage and transportation prior to imaging.

Once the proper physical properties have been imparted to imaging layer 12 and the receiving sheet 16 has been placed on layer 12, an electrical field is applied across the manifold sandwich through electrodes 18 and 21 which are connected to potential source 28 and resistor 30. Although FIG. 2 shows the manifold sandwich not coming in contact with either electrode 18 or 21, receiver and donor layers 16 and 17 are preferably insulating materials and they may contact one or both the electrodes during the charging operation. Preferably, the sandwich will contact one electrode to serve as a guide which is in spaced relationship to the other electrode to prevent binding.

Alternatively, the charging electrode may be a corona discharge device or a roller such as roller 26 which may be conductive, for example, and can be used to charge the sandwich in place of electrode 18. A sharp edge or friction charging device, a fur-covered roller can also be employed.

Figure 1:
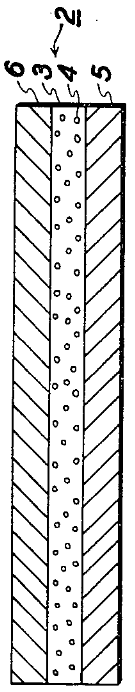
FIG. 1 is a side view of a manifold sandwich.
Figure 2:
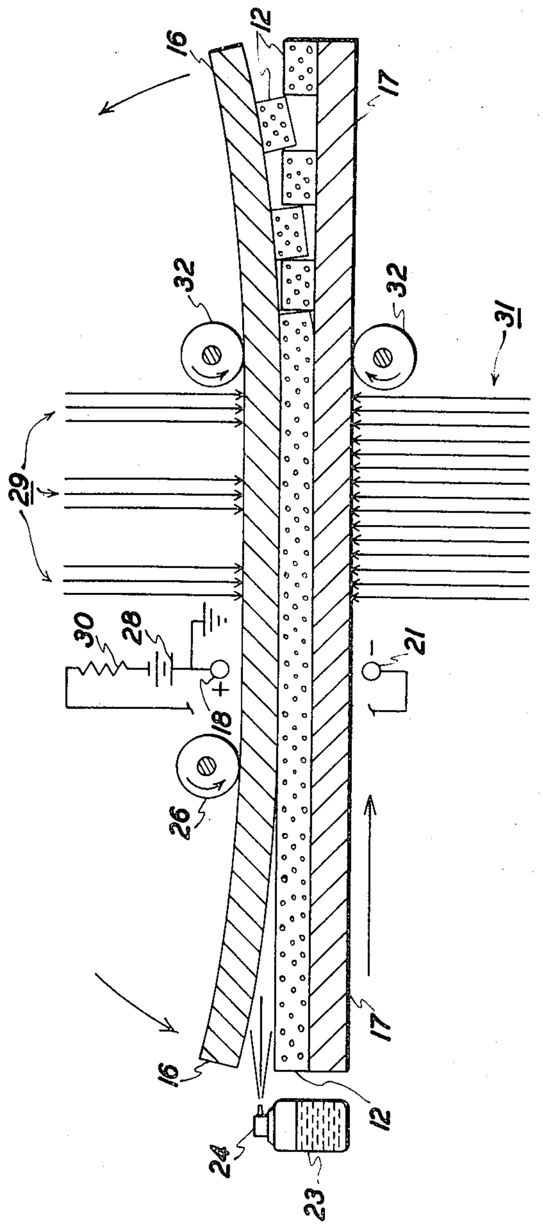
FIG. 2 is a side sectional view diagrammatically illustrating the process steps of this invention.

The sign of the charge as shown on electrodes 18 and 21 may also be reversed, electrode 18 being made the negative electrode and electrode 21 being made the positive electrode. The charge-bearing manifold sandwich moves in the direction indicated by the arrow to an imaging station where it is exposed to light image 29 through the receiver layer. Light image 29 may be light projected through a transparency or light information projected from an opaque subject. In a continuous operation, the light image preferably is projected through a slit in such a manner that there is little or no relative movement between the projected light image and the manifold sandwich. Although uniform, general exposure through the donor sheet can take place either before or after imagewise exposure of the imaging layer through the receiver sheet, FIG. 2 shows the preferred embodiment of this invention wherein the general uniform exposure 31 through the donor sheet takes place simultaneously with the imagewise exposure of the imaging layer through the receiver sheet. After exposure, the manifold sandwich then passes rollers 32 which act as guides for the manifold sandwich and as a bearing point for the stripping apart of the receiver and donor sheets. Upon separation of substrate 17 and receiving sheet 16, imaging layer 12 fractures along the edges of exposed areas and leaves the surface where it adhered to substrate 17. Accordingly, once separation is complete, portions of imaging layer 12 exposed to imagewise exposure through the receiver layer 16 are retained on substrate 17 and portions of imaging layer 12 which were not exposed to light through the receiver sheet 16 transfer to receiver sheet 16 providing a positive image on the receiver sheet and a negative image on the donor sheet.

If a relatively volatile activator is employed, such as petroleum ether or carbon tetrachloride, fixing of the image occurs almost instantaneously after separation of the sheet of 16 and 17 because the relatively small quantity of activator in imaging layer 12 evaporates quickly. With somewhat less volatile activators, such as Sohio Odorless Solvents 3440 or Freon 214 described above, fixing may be accelerated by blowing air over the images or warming them to about 150° F. With the less volatile activators, such as transformer oil, fixing is accomplished by absorption of the activator into another layer such as paper. Many other fixing techniques and methods for protecting the image such as overcoating, laminating with a transparent sheet and the like will occur to those skilled in the art.

DESCRIPTION OF THE PREFERRED EMBODIMENTS

The following examples further specifically illustrate the present invention. The examples below are intended to illustrate various preferred embodiments of the improved imaging method. The parts and percentages are by weight unless otherwise indicated.

EXAMPLE I

A commercial metal-free phthalocyanine is first purified by o-dichlorobenzene extraction to remove organic impurities. Since this extraction step yields the less sensitive beta crystalline form, the desired "*x*" form is obtained by dissolving about 100 grams of beta in approximately 600 cc. of sulfuric acid precipitating it by pouring the solution into about 3000 cc. of ice water and washing with water to neutrality. The thus purified alpha phthalocyanine is then salt milled for 6 days and desalted by slurrying in distilled water, vacuum filtering, water washing and finally methanol washing until the initial filtrate is clear. After vacuum drying to remove residual methanol, the "*x*" form phthalocyanine thus produced is used to prepare the imaging layer according to the following procedure: About 5 grams of the "*x*" form phthalocyanine is added to about 5 grams of Algol Yellow GC, 1,2,5,6-di (C,C'-diphenyl) thiazole-anthraquinone, C.I. No. 67300, available from General Dyestuffs, and about 2.8 grams of purified Watchung Red B, 1-(4'-methyl-5'-chloroazobenzene-2'-sulfonic acid)-2-hydroxy-3-naphthoic acid, C.I. No. 15865, available from E. I. du Pont de Nemours & Co., which is purified as follows: approximately 240 grams of the Watchung Red B is slurried in about 2400 milliliters of Sohio Odorless Solvent 3440, a mixture of kerosene fractions available from the Standard Oil Company of Ohio. The slurry is then heated to a temperature of about 65° C. and held there for about ½ hour. The slurry is then filtered through a glass sintered filter. The solids are then reslurried with petroleum ether (90 to 120° C.) available from Matheson, Coleman and Bell Division of the Matheson Company, East Rutherford, N.J., and filtered through a glass sintered filter. The solids are then dried in an oven at about 50° C.

About 8 grams of Sunoco Microcrystalline Wax Grade 5825 having an ASTM-D-127 melting point of 151° F. and about 2 grams of Paraflint R.G., a low molecular weight paraffinic material, available from the Moore & Munger Company, New York, N.Y., and about 144 milliliters of petroleum ether (90 to 120° C.) and about 40 milliliters of Sohio Odorless Solvent 3440 are placed with the pigments in a glass jar containing ½ inch flint pebbles. The mixture is then milled by revolving the glass jar at about 70 r.p.m. for about 16 hours. The mixture is then heated for approximately two hours at about 45° C. and allowed to cool to room temperature. The mixture is then ready for coating on the donor substrate. The paste-like mixture is then coated in subdued green light on 2 mil Mylar (a polyester formed by the condensation reaction between ethylene glycol and tetraphthalic acid available from E. I. du Pont de Nemours & Co., Inc.) with a No. 36 wire wound drawdown rod to produce a coating thickness when dried of approximately 7½ microns. The coating and two mil Mylar sheet is then dried in the dark at a temperature of about 33° C. for ½ hour. The coating is activated by applying thereto Sohio Odorless Solvent 3440 by means of a soft brush and a 2 mil thick Mylar receiver sheet is laid over the activated imaging layer.

The thus formed manifold sandwich is then placed donor side down on the tin oxide surface of a NESA glass electrode. A black paper electrode is laid over the receiver and connected to the negative terminal of a 9,000 volt D.C. power supply. The positive terminal of the power supply is connected to the NESA coating in series with a 5,500 megohm resistor. With the voltage applied, a white incandescent uniformly distributed light is projected upward through the NESA glass and the donor sheet providing a total incident energy of about 14 foot-candle seconds. After exposure the black paper electrode is removed from the receiver side of the sandwich and a positive transparency is placed over the receiver. The Mylar receiver retains the electrical charge imposed upon it by the black paper electrode so as to maintain the electric charge imposed upon it by the black paper electrode so as to maintain the electric field across the imaging layer. White incandescent light is projected through the transparency so as to provide a total incident energy of about .26 foot-candle second on the exposed portions of the imaging layer. After exposure the receiver is separated from the donor sheet thereby fracturing the imaging layer to provide a positive image on the receiver sheet and a negative image on the donor sheet.

EXAMPLE II

The procedure of Example I is repeated except that a transparent conductive sheet of cellophane is employed in place of the black paper electrode and the light is projected through the positive transparency overlying the cellophane electrode. During imagewise exposure of the imaging layer through the receiver, the imaging layer is also exposed through the donor sheet by white incandescent uniformly distributed light. Upon separation of the sandwich with the potential still applied, excellent quality images are produced with a positive of the original image residing on the receiver sheet and a negative image residing on the donor sheet.

EXAMPLE III

The procedure of Example I is repeated with the exception that after imagewise exposure to the imaging layer through the receiver sheet, the polarity of the electrical potential across the imaging layer is reversed by replacing the black opaque electrode over the receiver sheet and reversing the leads to the power supply. Upon separation of the sandwich under the reversed field, there are provided excellent quality images with a positive image on the donor sheet and a negative image on the receiver sheet.

Although specific components and proportions have been stated in the above description of preferred embodiments of the invention, other typical materials as listed above if suitable may be used with similar results. In addition, other materials may be added to the mixture to synergize, enhance or otherwise modify the properties of the imaging layer. For example, various dyes, spectral sensitizers or electrical sensitizers such as Lewis acids may be added to the several layers.

Other modifications and ramifications of the present invention will occur to those skilled in the art upon a reading of the present disclosure. These are intended to be included within the scope of this invention.

What is claimed is:

1. A method of imaging comprising the steps of (a) providing an electrically photosensitive imaging layer sandwiched between a donor layer and a receiver layer both of said layers being at least partially transparent to electromagnetic radiation to which said imaging layer is sensitive, said imaging layer being structurally fracturable in response to the combined effect of an applied electric field and exposure to said electromagnetic radiation;

(b) applying an electric field across said imaging layer;

(c) exposing said imaging layer to (i) an imagewise pattern of said electromagnetic radiation through said receiver layer and (ii) said electromagnetic radiation uniformly distributed through said donor layer; and (d) separating said receiver layer from said donor layer while under said electric field whereby said imaging layer fractures in imagewise configuration with a positive image adhering to one of said donor and receiver layers and a negative image adhering to the other of said donor and receiver layers.

2. The method of claim 1 further including the step of rendering said layer structurally fracturable in response to the combined effect of an electric field and exposure to electromagnetic radiation by applying thereto an activating amount of an activator for said layer.

3. The method of claim 1 wherein the donor and receiver layers are electrically insulating and said potential is applied by static charges in said layers.

4. The method of claim 1 wherein said imaging layer comprises an organic electrically photosensitive material.

5. The method of claim 4 wherein the organic electrically photosensitive material is a metal-free phthalocyanine.

6. The method of claim 1 wherein said electromagnetic radiation is in the visible light range.

7. The method of claim 1 further including the step of reversing the polarity of the electric field across the imaging layer subsequent to the exposure step.

8. The method of claim 1 wherein the imaging layer is exposed ot said uniformly distributed electromagnetic radiation through said donor layer prior to imagewise exposure through said receiver layer.

9. The method of claim 1 wherein the said imaging layer is exposed to said uniformly distributed electromagnetic radiation through said donor layer simultaneous with the imagewise exposure of said imaging layer through said receiver layer.

10. The method of claim 1 wherein the imaging layer is exposed to said uniformly distributed electromagnetic radiation through said donor layer subsequent to exposure of the imaging layer to said imagewise pattern of said electromagnetic radiation.

11. The method of claim 1 wherein the electric field is in the range of the from about 2,000 volts per mil to about 10,000 volts per mil.

References Cited

UNITED STATES PATENTS

| | | | |
|---|---|---|---|
| 2,833,648 | 5/1958 | Walkup | 96—1 |
| 3,005,707 | 10/1961 | Kallmann et al. | 96—1 |
| 3,438,772 | 4/1969 | Gundlach | 96—1 |
| 3,445,225 | 5/1969 | Brynko et al. | 96—1 |
| 3,446,616 | 5/1969 | Clark | 96—1.5 |
| 3,457,070 | 7/1969 | Watanabe et al. | 96—1.4 |
| 3,510,419 | 5/1970 | Carreira et al. | 96—1.5 X |
| 3,512,968 | 5/1970 | Tulagin | 96—1 X |
| 3,519,420 | 7/1970 | Goffe | 96—1 |

GEORGE F. LESMES, Primary Examiner

J. R. MILLER, Assistant Examiner

U.S. Cl. X.R.

96—1.1; 204—1.5 181